3,108,705
PIPETTE WASHING BASKET
Billy Reade Barber, Durham, N.C., assignor to Duke University, Durham, N.C., a corporation of North Carolina
Filed June 27, 1962, Ser. No. 205,587
3 Claims. (Cl. 220—4)

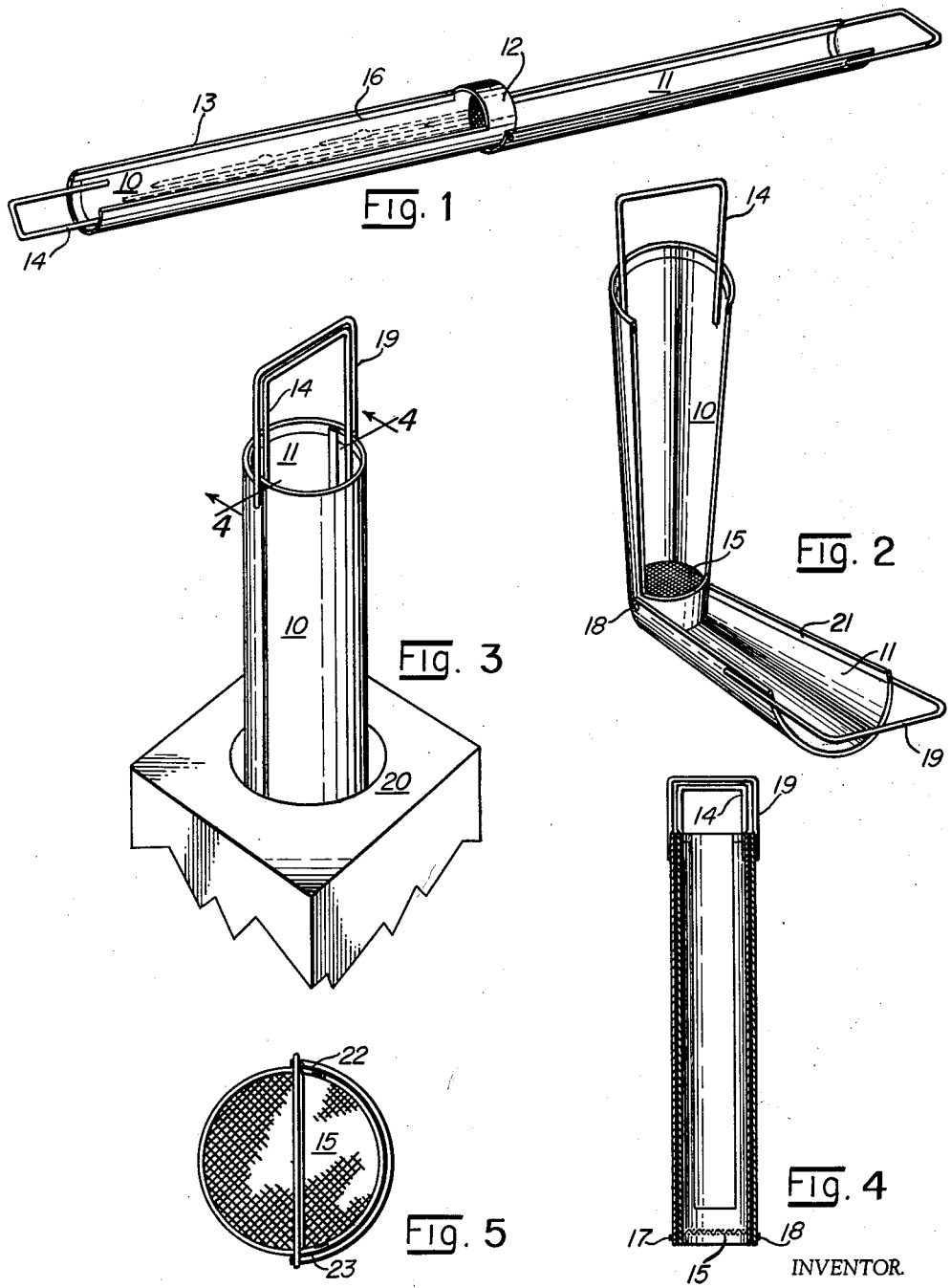

This invention is concerned with a basket useful in washing laboratory apparatus such as pipettes, glass tubes and the like.

The customary way of washing tubular apparatus such as pipettes, thermometers, glass tubes and similar elongated ware used in chemical and medical laboratories is to place the same in the open end of a vertically disposed cylindrical shaped basket having a wire mesh bottom after which the basket is sloshed up and down in a mating cylindrical sink which contains the washing solution. The cylindrical sink is customarily built into an overall laboratory sink that may include rectangular and other shapes of sinks for other purposes. The fact that such sinks are already standardized to a great extent means however that the various washing baskets used with the sinks must be adapted to the shape sinks that already exist. Once the apparatus has been sloshed sufficiently in the washing solution, the basket is taken from the cylindrical sink and the contents removed. The task of removing the pipettes and other objects from the conventional basket presents certain difficulties however in that the user is required to either tilt the basket downwardly and let the contents slide out or else attempt to extract the objects by lifting them out of the top. In either case, the user is apt to break the objects many of which are fragile by reason of not being able to see them as they are being removed. Because of the fact that some of the objects are usually relatively short and others relatively long, they frequently become lodged against each other within the cylinder which contributes to the difficulty of removing them without damage. Furthermore, the user is unable to see any broken glass that may be in the basket.

Accordingly, an object of this invention is to provide an improved washing basket for pipettes and the like which is adaptable to being used with the standard circular sink and which allows the user to see the placement of the objects being washed both during loading and unloading of the basket.

Another object of this invention is to provide an imprived washing basket for pipettes and the like in which the conventional cylindrical form is retained but which allows a portion of the basket wall to be opened during loading and unloading to facilitate these operations and minimize breakage.

Another object is to provide an improved cylindrical type washing basket for pipettes and the like which is adapted to being both loaded and unloaded while positioned horizontally.

Another object is to provide an improved cylindrical type washing basket for pipettes and the like having a pivoted wall portion to facilitate the loading and unloading operations and which includes means to insure that the fixed and pivoted portions of the basket will not separate during the washing process.

The above and other objects of the invention will become apparent as the description proceeds, and in the drawings, in which:

FIGURE 1 is a perspective of the improved basket in horizontal loading and unloading position with typical glassware being indicated in dotted lines.

FIGURE 2 is a perspective of the improved basket in vertical position as it appears empty and with the cover open.

FIGURE 3 is a perspective of the improved basket as it appears when closed and being lowered in a mating sink.

FIGURE 4 is a vertical section of the improved basket taken along line 4—4 of FIGURE 3.

FIGURE 5 is a plan view looking directly down on the improved basket in closed position.

Referring to the drawings in which like numbers represent like members in each of the drawings, the basket is made as a thin, flexible, smooth wall receptacle and includes a base portion 10 and a cover portion 11. Twenty gauge stainless steel is ideally suited to the invention. The base portion 10 is formed as an open cylinder at one end as at 12. As a continuation of this cylinder end, the remainder of the base portion 10 is formed as a semi-cylinder as at 13 and at the end of the base portion 10 opposite the cylinder end, there is welded a U-shaped rod-like handle 14. Within the cylinder end 13, there is fitted a flat, mesh bottom 15 for purposes of supporting the glassware and draining the basket. Mesh bottom 15 is made as an integral piece preferably of stainless steel, plain weave, 0.025 size wire with twelve squares per inch. To complete the description of base portion 10, it will be noted that the edges are preferably turned in as 16 to give rigidity to the structure and to present a smooth edge where the basket is formed of sheet metal. It should of course be understood that the basket may well be formed of a plastic, a suitable form of construction glass or any other material suitable to structures of this kind.

Pivoted to base portion 10 by means of suitable rivets or pins as indicated at 17, 18 is the cover portion 11. Cover 11 is entirely semi-cylindrical in form and also includes a U-shaped rod-like handle 19 fixedly secured to cover 11 as by welding and which when moved to vertical position overlaps handle 14 so that both handles may be secured together during sloshing of the basket in the sink represented at 20. As with the base portion 10, it is preferred that when formed of metal that the edges of cover 11 be turned in as at 21.

It will be particularly noticed in FIGURE 5 that the cover 11 when closed on base portion 10 slightly overlaps as at 22 and 23. By providing sufficient area of contact and making this a relatively tight or wedging fit, the two parts of the basket have an elastic friction fit and are unlikely to become dislodged in use even though the handles are not being held together. It will be understood of course that when the handles are brought and held together there is no possibility of the halves of the cylinder separating and the contents spilling. Both of these locking features have been found to be valuable in actual use of the invention.

From the foregoing description, it will be seen that I have retained the advantages of the conventional cylindrical type basket and at the same time have by, in effect, splitting the basket made it possible to view the contents of the basket and the manner in which the contents are placed both for the loading and unloading operations. With these additional advantages brought about by the invention, much of the glassware breakage experienced in hospitals, laboratories and the like will be eliminated. In addition, the invention also allows personnel to see and remove broken glass during loading and unloading so as to avoid personal injuries to their hands.

While primarily described in connection with cylindrical type baskets and sinks, I am aware that some baskets and sinks partake more of a square shape than a purely cylindrical shape and for such installations the invention may be easily modified by those skilled in the art. That is, for these installations the base portion 10 and cover 11 should be bent so as to form when closed a relatively elongated square rather than elongated cylindrical basket. Where the words "cylinder," "cylindrical" and the like appear in the claims it is intended therefore that the claims cover both forms of the invention.

Having described my invention, what I claim is:

1. A washing basket for pipettes, tubular glassware and the like comprising, in combination, a thin, flexible, smooth wall receptacle adapted to being disposed vertically for washing and horizontally for loading and having a cylindrical base portion and a semi-cylindrical top portion integral with, substantially longer than, and formed as a continuation of the wall of said base portion; a flat, perforated, integral drain wall secured to and completely closing the end of said base portion; a loop handle fixedly secured to said top portion; a thin, flexible, smooth wall semi-cylindrical cover having substantially the same curvature and length as said receptacle and being hingedly mounted on said base portion and swingable opposite said top portion, said cover being adapted when closed to effectively extend said base portion and thereby form said basket as an open ended cylinder with said base portion being enclosed therein and with said drain wall forming the base thereof; and an additional loop handle fixedly secured to said cover and movable to a closed position adjacent said first loop handle whereby both may be grasped and said cover and receptacle held together during lifting of said basket.

2. A washing basket for pipettes, tubular glassware and the like comprising, in combination, a thin, flexible, smooth wall receptacle adapted to being disposed vertically for washing and horizontally for loading and having a cylindrical base portion and a semi-cylindrical top portion integral with, substantially longer than, and formed as a continuation of the wall of said base portion; a flat, perforated, integral drain wall secured to and closing the end of said base portion; a loop handle fixedly secured to said top portion; a thin, flexible, smooth wall semi-cylindrical cover having the curvature of said receptacle, being hingedly mounted on said base portion and swingable opposite said top portion and being adapted when closed to cover and at least slightly overlap in a wedging fit said top portion, said wedging fit acting to retain said cover and receptacle together when disposed vertically and said cover acting when closed to effectively extend said base portion whereby to form said basket as an open ended cylinder with said base portion being enclosed therein and with said drain wall forming the base thereof; and an additional loop handle fixedly secured to said cover and movable to a closed position adjacent said first loop handle whereby both may be grasped and said cover and receptacle held together during lifting of said basket.

3. A washing basket for pipettes, tubular glassware and the like comprising, in combination, a thin, flexible, smooth wall receptacle adapted to being disposed vertically for washing and horizontally for loading and having a cylindrical base portion and semi-cylindrical top portion integral with, substantially longer than, and formed as a continuation of the wall of said base portion; a flat, perforated, integral drain wall secured to and completely closing the end of said base portion; a loop handle fixedly secured to said top portion; a thin, flexible, smooth wall semi-cylindrical cover having substantially the same curvature and length as said receptacle; means mounting said cover on said base portion and adapting said cover when closed to effectively extend said base portion and thereby form said basket as an open ended cylinder with said base portion being enclosed therein and with said drain wall forming the base thereof; and an additional loop handle fixedly secured to said cover and movable to a closed position adjacent said first loop handle whereby both may be grasped and said cover and receptacle held together during lifting of said basket.

References Cited in the file of this patent
UNITED STATES PATENTS

| | | |
|---|---|---|
| 903,634 | Troemel | Nov. 10, 1908 |
| 1,592,829 | Hyde | July 20, 1920 |
| 1,866,316 | Miller | July 5, 1932 |